United States Patent [19]

Minoura et al.

[11] Patent Number: 4,571,021

[45] Date of Patent: Feb. 18, 1986

[54] PLURAL-BEAM SCANNING APPARATUS

[75] Inventors: Kazuo Minoura; Masamichi Tateoka, both of Yokohama, Japan

[73] Assignee: Canon Kabushiki Kaisha, Tokyo, Japan

[21] Appl. No.: 504,420

[22] Filed: Jun. 15, 1983

[30] Foreign Application Priority Data

Jun. 25, 1982 [JP] Japan ............................... 57-109368

[51] Int. Cl.⁴ ............................................. G02B 27/17
[52] U.S. Cl. ................................................... 350/6.8
[58] Field of Search ......................................... 350/6.8

[56] References Cited

U.S. PATENT DOCUMENTS 4,474,422 10/1984 Kitamura ............................ 350/6.8

Primary Examiner—John K. Corbin
Assistant Examiner—Rebecca D. Gass
Attorney, Agent, or Firm—Fitzpatrick, Cella, Harper & Scinto

[57] ABSTRACT

This specification discloses a plural-beam scanning apparatus in which the directions of light emission of light-emitting portions such as semiconductor lasers or light-emitting diodes are determined so that the central rays of light beams emitted from the light-emitting portions are emitted as if they originate from or pass through substantially the same point as viewed from a direction perpendicular to the deflection scan plane and which has a deflector for deflecting a plurality of light beams from the light source unit at one time and optical means for making said same point and a point near the deflecting-reflecting surface of the deflector optically conjugate.

11 Claims, 10 Drawing Figures

PLURAL-BEAM SCANNING APPARATUS

BACKGROUND OF THE INVENTION

1. Field of the Invention

This invention relates to a scanning apparatus using a plurality of light sources such as semiconductor lasers or light-emitting diodes as a light source unit.

2. Description of the Prior Art

When an attempt is made to make the pitch of scanning lines dense by using a so-called semiconductor laser array having a plurality of light output portions arranged side by side as shown in Japanese Laid-open Patent Application No. 158251/1979, the direction of the semiconductor laser array must be obliquely inclined instead of being made orthogonal to the scanning lines. Each light beam from such a semiconductor laser array is emitted with a light ray parallel to the normal to the end surface of the array as the central ray.

Referring to FIG. 1 of the accompanying drawings which shows an example of the plural-beam scanning apparatus according to the prior art, central rays ha and hb are emitted from a plurality of light output portions 1a and 1b provided in a semiconductor laser device 1, in parallelism to the optical axis g of a condenser lens 2. These central rays pass through the focus F of the condenser lens 2 and through a cylindrical lens 3 to the deflecting-reflecting surface 4a of a deflector 4. At this time, the central rays ha and hb from the light output portions 1a and 1b are reflected on the deflecting-reflecting surface 4a at positions spaced apart from each other in the direction of deflection of the light beam by the deflector.

The light beams emitted from the light output portions 1a and 1b and passed through the condenser lens 2 are formed as line images near the deflecting-reflecting surface 4a by the cylindrical lens 3.

The light beams reflected by the deflecting-reflecting surface 4a are imaged on the surface of a medium 6 to be scanned such as a photosensitive medium by an anamorphic scanning lens system 5.

FIG. 2 of the accompanying drawings shows the manner of imaging in a plane orthogonal to the plane of the drawing sheet of FIG. 1. In FIG. 2, use is made of an anamorphic scanning lens for making a point near the deflecting-reflecting surface 4a and a point on the surface of the photosensitive medium conjugate.

The anamorphic scanning lens 5 comprises, for example, a spherical lens 5a and a toric lens 5b.

The central rays ha and hb emitted from the light output portions 1a and 1b of the semiconductor laser device enter the deflecting-reflecting surface 4a at the positions thereon spaced apart from each other, as previously described. That is, as regards the center positions of the line images formed by the cylindrical lens 3, the center position of only the line image corresponding to any one of the plurality of light output portions can be set up at a desired position, but the center positions of the other line images are spaced apart from the desired position. The optical path indicated by broken lines in FIG. 2 shows the manner of imaging in this case, and the center position P of the deviated line image is deviated from the desired position and is not imaged on the surface of the medium to be scanned by the lens system 5, but is imaged at a point P' spaced apart from the surface of the medium to be scanned, with a result that so-called defocus is created. When the deflecting mirror 4 is rotated, the amount of defocus becomes remarkably great and thus, the spot imaged on the surface of the medium to be scanned becomes large.

SUMMARY OF THE INVENTION

It is an object of the present invention to overcome the above-noted disadvantages and to provide a scanning apparatus which enables each beam spot to be well imaged on the surface of a medium to be scanned even if a light source such as a semiconductor laser array is used.

In a plural-beam scanning apparatus in accordance with the present invention, the directions of light emissions of light-emitting portions such as semiconductor lasers or light-emitting diodes are determined so that the central rays of light beams are emitted from the light-emitting portions as if they originate from or pass through substantially the same point as viewed from a direction perpendicular to the deflection scan plane, and an optical system is set so that said same point and a point near the deflecting-reflecting surface of deflector means are in an optically conjugate relation in the deflection scan plane, namely, the plane which the normal to the deflecting-reflecting surface of the deflector forms with lapse of time along with rotation of the reflecting surface, thereby achieving the above object.

The fact that the central rays of the light beams emitted from the respective light-emitting portions pass through substantially the same point means that if viewed from a direction perpendicular to the deflection scan plane, the central rays of those light beams appear to intersect one another at a point, but if viewed from the deflection scan plane, each of said central rays is deviated slightly at said point of intersection in a direction orthogonal to the deflection scan plane.

Also, in the scanning apparatus according to the present invention, the effect to which the present invention is directed can be achieved even if the central rays of the emitted beams do not intersect one another strictly at a point as viewed from the direction perpendicular to the deflection scan plane but if those central rays are converged in a certain area.

The invention will become more fully apparent from the following detailed description thereof taken in conjunction with the accompanying drawings.

DESCRIPTION OF THE PREFERRED EMBODIMENTS

Figure 1:
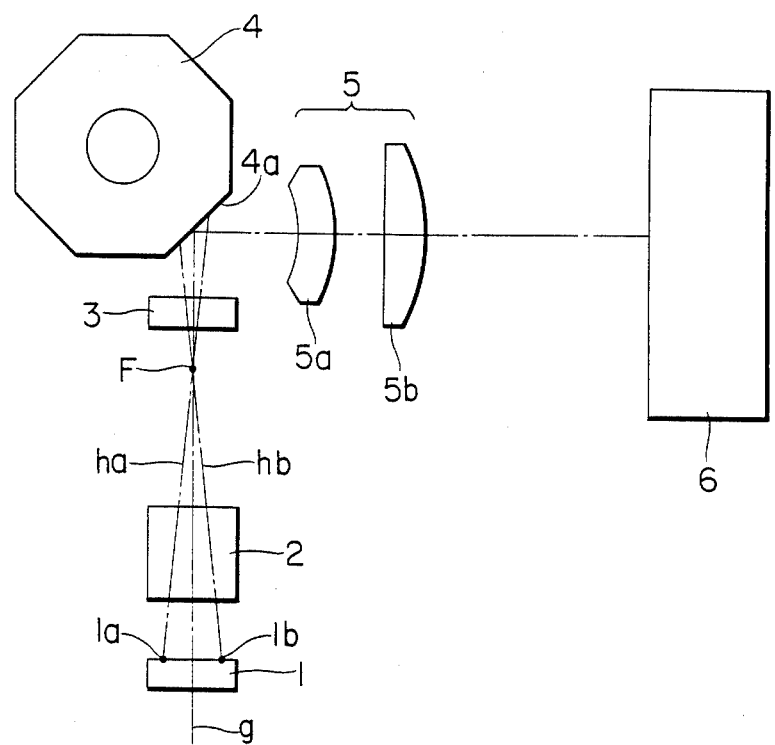
FIGS. 1 and 2 show the plural-beam scanning apparatus according to the prior art.
Figure 2:
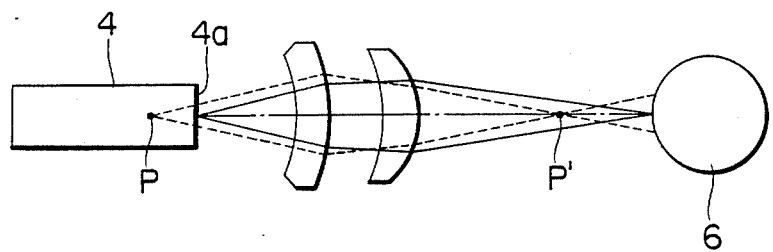
Figure 3:
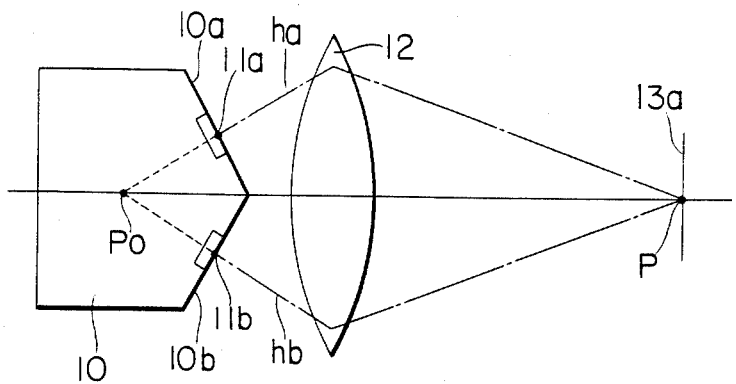
FIGS. 3, 4, 5, 6 and 7 illustrate several embodiments of a plural-beam scanning apparatus according to the present invention.

FIG. 3 is a view for illustrating the principle of the scanning apparatus according to the present invention, and shows an optical system between a light source and a deflector as seen from a direction perpendicular to the deflection scan plane. Reference characters 11a and 11b designate semiconductor lasers disposed on a mount 10 so that the light beam generating surfaces thereof are parallel to the end surfaces of the mount 10. The end surfaces 10a and 10b of the mount 10 on which the semiconductor lasers are provided are set as if the central rays of the light beams emitted from the lasers 11a, 11b passed through the same point Po. In other words, if normals are drawn to the end surfaces 10a and 10b at positions whereat the semiconductor lasers 11a and 11b are provided, the end surfaces 10a and 10b originated from or are set so that each of the normals passes through the point Po. Further, if viewed from a direction parallel to the deflection scan plane, the positions of the semiconductor lasers provided on the mount are set so that the position at which the central ray from each semiconductor laser passes through the point Po is slightly displaced in a direction orthogonal to the deflection scan plane. The point Po and a predetermined point P near the deflecting-reflecting surface 13a of the deflector are kept in an optically conjugate relation by an imaging lens 12. The semiconductor lasers 11a and 11b are disposed equidistantly from the imaging lens 12.

Figure 4:
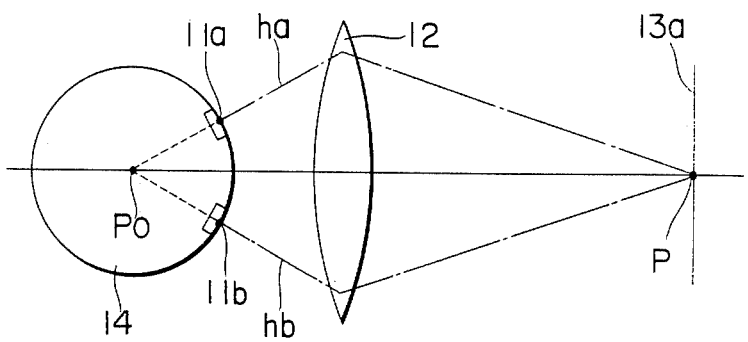

FIG. 4 shows an optical sytem between a light source and a deflector in another embodiment of the scanning apparatus according to the present invention as seen from a direction perpendicular to the deflection scan plane. In FIG. 4, reference characters similar to those in FIG. 3 designate similar members. In the apparatus shown in FIG. 4, semiconductor laser chips 11a and 11b are disposed so that the central ray of the light beam from each light-emitting portion emerges in the direction of a normal to the side surface (cylindrical surface) of a cylindrical or disc-like mount 14. The position of the center of the mount 14 is made coincident with the aforementioned point Po. Further, the relation between the central rays from the semiconductor laser chips at the point Po is the same as the condition described in connection with FIG. 3. Therefore, the disc-like mount 14 is provided at a certain angle without perpendicularly intersecting the perpendicular to the plane of the drawing sheet.

Figure 5:
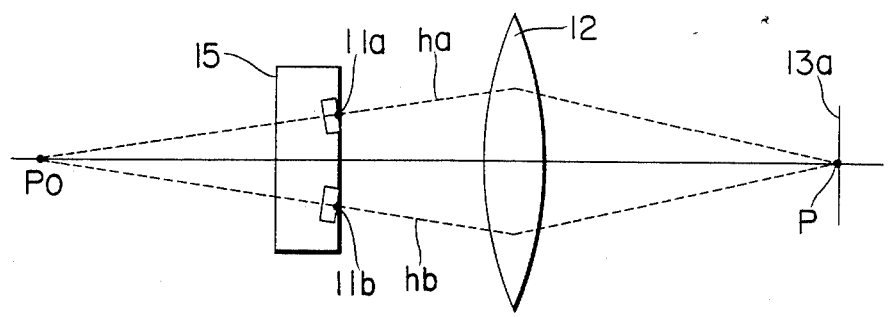

FIG. 5 shows a modification of the embodiments shown in FIGS. 3 and 4. This modification is entirely similar to the embodiments of FIGS. 3 and 4 with the exception that a mount 15 is of a rectangular shape and semiconductor laser chips 11a and 11b satisfying the aforementioned relation are disposed near one end surface of the planar or flat mount.

Figure 6:
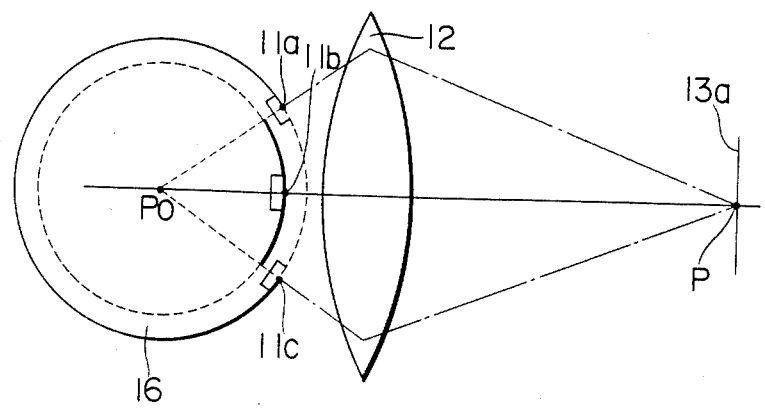
Figure 7:
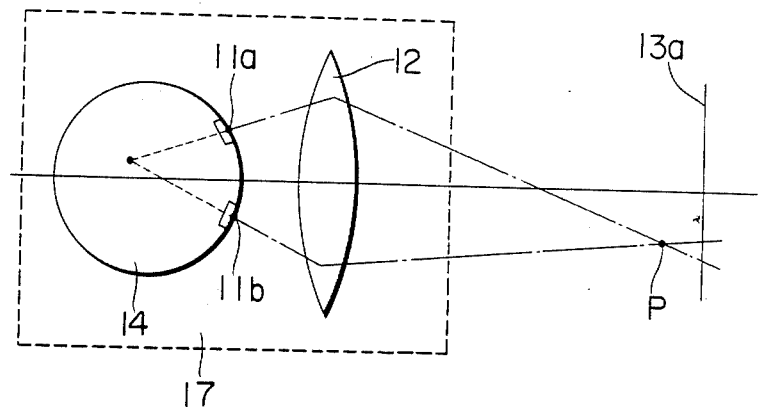

FIG. 6 shows an embodiment in which three semiconductor laser chips are disposed. In the above-described embodiments shown in FIGS. 3, 4 and 5, the number of semiconductor laser chips is two and it has been easy for the laser chips to be disposed equidistantly from the imaging lens 12. It is of course for the purpose of causing respective beam spots to be well imaged in substantially equal conditions on a surface to be scanned that the semiconductor lasers are disposed equidistantly from the imaging lens 12. In the embodiment shown in FIG. 6, the light output portions of three semiconductor lasers 11a, 11b and 11c are arranged on a straight line, that is, arranged in a plane perpendicular to the optical axis of the imaging lens system 12. In order that the central ray of the light beam from each light-emitting portion may be emitted as if originating from and passing substantially through a point Po, each laser chip is disposed so that each central ray emerges in the direction of the normal to the cylindrical surface which is the side surface of a disc-like mount 16. The surface of the disc-like mount 16 on which the laser chips are installed is not perpendicular but more or less inclined with respect to the perpendicular to the plane of the drawing sheet so that the central rays from the light-emitting portions are not perfectly coincident with each other at the point Po but are in spatially twisted relation with each other at the point Po. Where two light output portions are used, it is possible to alleviate the arrangement interval thereof or the alignment accuracy in the direction of emergence of each central ray. When said accuracy is insufficient where the number of light output portions is two, the central ray of the light beam emitted from each light output portion does not pass through a desired point near the deflecting surface 13a, but when viewed from a direction perpendicular to the plane in which the light beam is deflected by the deflecting surface, there is a place at which said two central rays intersect each other. FIG. 7 shows such a case. In such a case, the point of intersection P between said two central rays is made coincident with a desired position near the deflecting mirror surface 13a in the following manner. That is, the point of intersection P between said two central rays can be made coincident with the desired position by adjustment of the parallel movement in two orthogonal directions of a light beam condensing system 17 comprising the mount 14 and the imaging lens 12 made integral with each other or by adjustment of the rotation of the light beam condensing system about an axis perpendicular to the plane of the drawing sheet of FIG. 7 and adjustment of the parallel movement of the light beam condensing system in the direction of the optical axis.

Figure 8A:
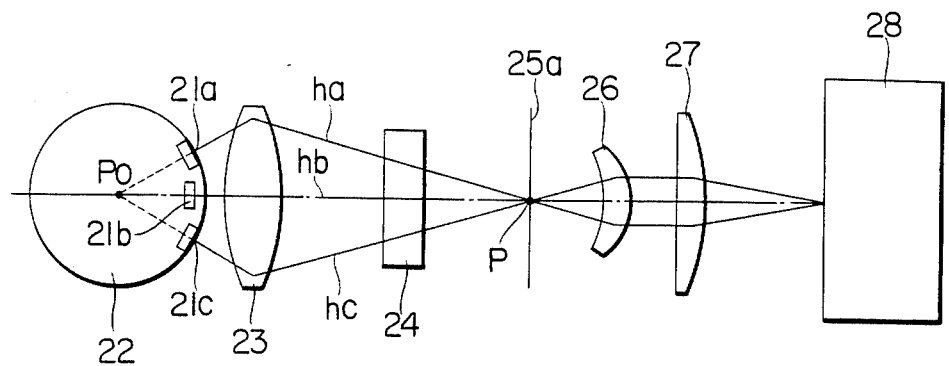
FIGS. 8(A), 8(B) and 8(C) show an embodiment of a tilt correcting optical system to which the apparatus according to the present invention is applied.
Figure 8B:
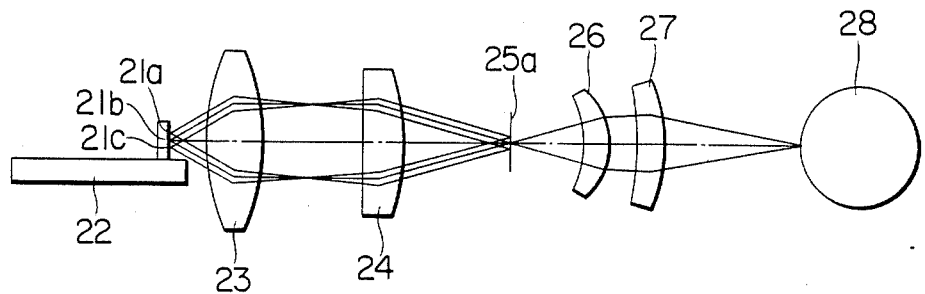

FIGS. 8(A) and 8(B) are schematic developed views showing an embodiment of a tilt correcting scanning apparatus to which the scanning apparatus according to the present invention is applied, FIG. 8(A) being a plan view, i.e., a view showing the state of the light beam in the scan plane, and FIG. 8(B) being a front view, i.e., a view showing the state of the light beam in the tilt correcting plane. Semiconductor laser chips 21a, 21b and 21c are disposed as if the central rays of the light beams emitted from these semiconductor lasers were emitted from a position Po as described in connection with FIG. 6, and each light beam enters an imaging lens 23. The imaging lens 23 makes the position Po and a position P near the deflecting-reflecting surface 25a of a deflector 25 optically conjugate. Accordingly, in the scan plane, the central rays ha, hb and hc of the respective light beams converge at the point P.

Figure 8C:
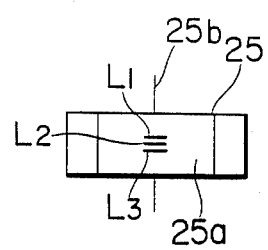

On the other hand, in the tilt correcting cross-section, the light-emitting portions of the semiconductor lasers 21a, 21b and 21c are provided so that their positions are substantially coincident with the focal plane of the imaging lens 23 and therefore, each light beam is collimated by the imaging lens 23. These collimated light beams are condensed by a positive cylindrical lens 24 having a power only in the tilt correcting cross-section and are imaged near the deflecting-reflecting surface 25a. Accordingly, near the deflecting-reflecting surface 25a of the deflector 25, three line images L1, L2 and L3 are formed side by side in the direction of the rotational axis 25b of the deflector, as shown in FIG. 8(C). These line images are imaged as a good spot on a rotatable drum 28 by a scanning lens system comprising a spherical lens 26 and a toric lens 27 as shown in Japanese Laid-open Patent Application No. 36622/1981. In FIG. 8(B), the imaging light beam only of L2 is shown as representative.

Examples of numerical data will be shown below.

As a first example of numerical data, when the focal length of the imaging lens 23 is 11 mm and the spacing between the cylindrical lens 24 and the deflecting-reflecting surface 25a is 100 mm, the distance between the imaging lens 23 and the point Po is 12.36 mm and, in the embodiment of FIG. 4, the radius of the cylindrical mount 14 is 1.36 mm. Accordingly, if the spacing between the semiconductor laser chips is 0.4 mm, the inclination of the central ray of the light beam from each light output portion with respect to the optical axis of the imaging lens 23 is 4.86°.

As a second example of numerical data, when the focal length of the imaging lens 23 is 21 mm and the spacing between the cylindrical lens 24 and the deflecting-reflecting surface 25a is 100 mm, the distance between the imaging lens 23 and the point Po is 26.58 mm and, in the embodiment of FIG. 4, the radius of the cylindrical mount 14 is 5.58 mm. Accordingly, if the spacing between the semiconductor laser chips is 0.4 mm, the inclination of the central ray of the light beam from each light output portion with respect to the optical axis of the imaging lens 23 is 2.05°.

As described above, in the scanning apparatus according to the present invention, in spite of its simple construction, a plurality of scanning spots can scan the surface to be scanned in a good imaged condition.

What we claim is:

1. An apparatus for scanning a surface with a plurality of light beams, comprising:
    a light source unit having a plurality of light-emitting portions each for emitting a light beam;
    a deflector having a deflecting-reflecting surface for deflecting a plurality of said light beams emitted from said light source unit at one time in at least one deflection scan plane; said light emitting portions of said light source unit being disposed relative to said deflector so that the central rays of all of said plurality of light beams are emitted as if they originate from substantially the same point when viewed in a direction perpendicular to the deflection scan plane; and
    optical means for making said same point and a point near said deflecting-reflecting surface of said deflector optically conjugate.

2. An apparatus according to claim 1, wherein said light-emitting portions of said light source unit are semiconductor lasers, each including a light beam-emitting end surface, and wherein said light-emitting end surfaces are disposed so that the central rays of said laser light beams are emitted therefrom as if they originate from substantially the same point when viewed in a direction perpendicular to the deflection scan plane.

3. An apparatus according to claim 1, wherein the light-emitting portions of said light source unit are light beam-emitting diodes, and wherein said diodes are disposed so that the central rays of light beams are emitted therefrom as if they originate from substantially the same point when viewed in a direction perpendicular to the deflection scan plane.

4. An apparatus according to claim 1, further comprising a cylindrical or disc-like base plate on the cylindrical or disc-like surface of which said light-emitting portions of said light source unit are provided, each of said light-emitting portions being so provided so that the central ray therefrom is coincident with the direction of a normal to said cylindrical or disc-like surface of said base plate.

5. An apparatus for scanning a surface with a plurality of light beams, comprising:
    a light source unit having a plurality of light-emitting portions, each for emitting a light beam;
    a deflector having a deflecting-reflecting surface for deflecting a plurality of light beams emitted from said light source unit at one time in at least one deflection scan plane; said light emitting portions of said light source unit being disposed relative to said deflector so that the central rays of all of said plurality of light beams are emitted as if they originate from substantially the same point when viewed in a direction perpendicular to the deflection scan plane;
    first imaging means for making said same point and a point near said deflecting-reflecting surface of said deflector optically conjugate; and
    second imaging means disposed between said light source unit and said deflecting-reflecting surface for converging a component of each light beam orthogonal to the deflection scan plane and forming a slit image of each light beam on said deflecting-reflecting surface.

6. An apparatus according to claim 5, further comprising a cylindrical or disc-like base plate on the cylindrical or disc-like surface of which said light-emitting portions of said light source unit are provided, each of said light-emitting portions being so provided so that the central ray therefrom is coincident with the direction of a normal to said cylindrical or disc-like surface of said base plate.

7. An apparatus according to claim 5, wherein said light-emitting portions of said light source unit are semiconductor lasers, each including a light beam-emitting end surface, and wherein said light-emitting end surfaces are disposed so that the central rays of said laser light beams are emitted therefrom as if they originate from substantially the same point when viewed in a direction perpendicular to the deflection scan plane.

8. An apparatus according to claim 5, wherein the light-emitting portions of said light source unit are light beam-emitting diodes, and wherein said diodes are disposed so that the central rays of light beams are emitted therefrom as if they originate from substantially the same point when viewed in a direction perpendicular to the deflection scan plane.

9. An apparatus according to claim 5, further comprising third imaging means for imaging each light beam deflected by said deflector as a beam spot on a surface to be scanned, said third imaging means being provided between said deflector and the surface to be scanned.

10. An apparatus according to claim 1, wherein light-emitting portions of said light source unit are arranged linearly.

11. An apparatus according to claim 10, wherein the direction in which said light-emitting portions are linearly arranged is perpendicular to the optical axis of said optical means.

* * * * *

UNITED STATES PATENT AND TRADEMARK OFFICE
CERTIFICATE OF CORRECTION

PATENT NO. : 4,571,021

DATED : February 18, 1986

INVENTOR(S) : Minoura et al.

It is certified that error appears in the above-identified patent and that said Letters Patent is hereby corrected as shown below:

Column 2, line 54, change "tilt correcting" to --tilt-correcting--.

Column 3, line 2, change "11b passed through" to --11b originated from or passed through--; and
    line 5, change "10b originated/from or are" to --10b are--.

Column 4, line 29, change "tilt correcting" to --tilt-correcting--;
    lines 34-35, change "tilt correcting" to --tilt-correcting--;
    line 45, change "tilt correcting" to --tilt-correcting--; and
    line 52, change "tilt correcting" to --tilt-correcting--.

Column 5, line 31, change "light emitting" to --light-emitting--.

Column 6, line 10, change "light emitting" to --light-emitting--.

Signed and Sealed this

Sixth Day of January, 1987

*Attest:*

DONALD J. QUIGG

*Attesting Officer*    *Commissioner of Patents and Trademarks*